July 10, 1928.
H. W. MATHESON
PROCESS OF MAKING ACETIC ACID
Filed March 31, 1921
1,676,454
2 Sheets-Sheet 1
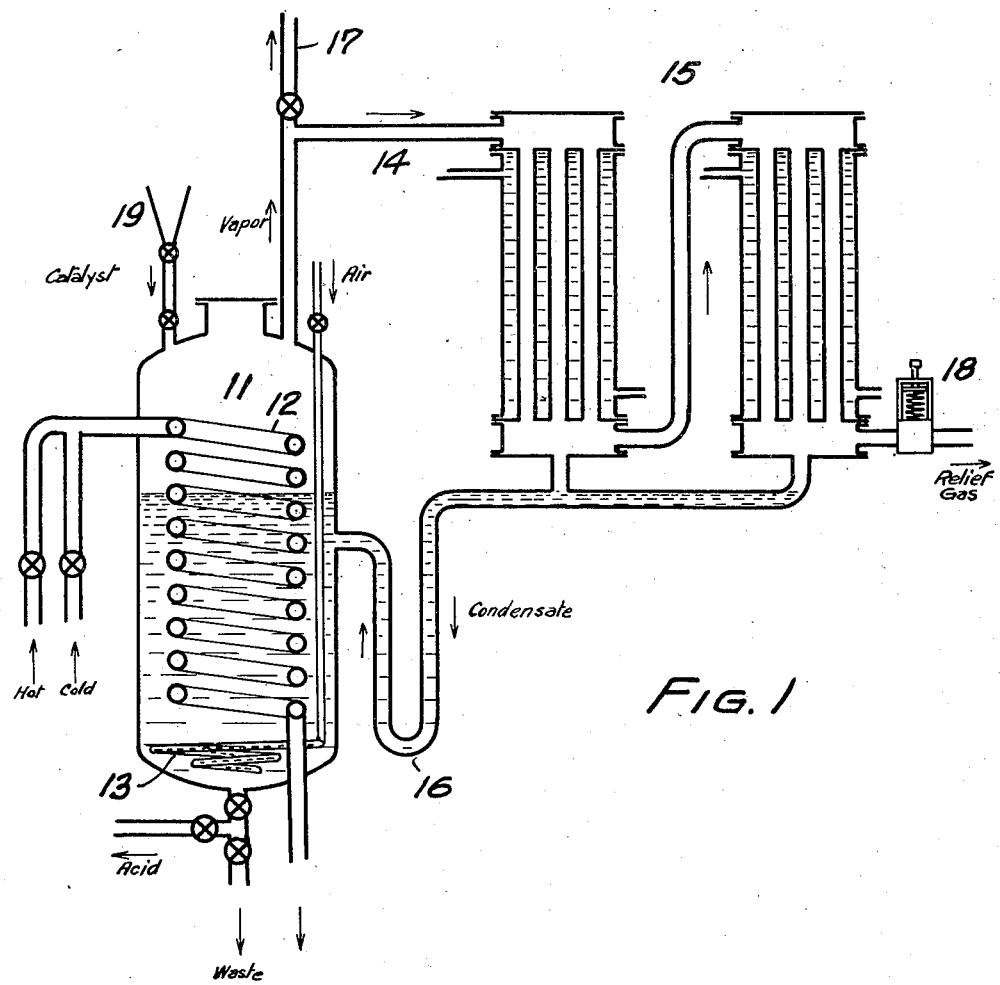
FIG. 1
Inventor
Howard W. Matheson
By
Attorney Boiling point curves of various acetic acid-acetaldehyde mixtures at different pressures.

Patented July 10, 1928.

1,676,454

UNITED STATES PATENT OFFICE.

HOWARD W. MATHESON, OF MONTREAL, QUEBEC, CANADA, ASSIGNOR TO CANADIAN ELECTRO PRODUCTS COMPANY, LIMITED, OF MONTREAL, QUEBEC, CANADA.

PROCESS OF MAKING ACETIC ACID.

Application filed March 31, 1921. Serial No. 457,465.

This invention relates to improvements in the manufacture of acetic acid from acetaldehyde, and the object of the invention is to provide for the commercial manufacture of acetic acid of great purity at a high rate of speed and at a low cost.

According to the present invention, the process consists briefly in passing air, oxygen or gases containing oxygen through acetaldehyde in the presence of a suitable catalyst under certain conditions of temperature and pressure.

The process is carried out in all cases at super-atmospheric pressure and at comparatively high temperatures, so that oxygen is absorbed with great rapidity, suitable precautions being taken to avoid oxygen-aldehyde vapor mixtures which are violently explosive when under pressure. When working with pure oxygen super-atmospheric pressures may be readily obtained without danger of explosion, by providing an atmosphere over the reaction liquid which is inert with regard to the materials of the process. The vapors which result from the process are condensed and the condensate may be returned to the reaction. Waste gases which may accompany the vapors are scrubbed to remove traces of acetaldehyde and acetic acid and are then suitably disposed of. As the reaction proceeds the acetaldehyde is gradually converted into acetic acid until the concentration of acid reaches such a degree that further operations are not economical, whereupon the process is stopped and the acid is separated from the unchanged aldehyde and purified by fractional distillation.

The features of the present invention, which particularly distinguish it from previously known processes, are; first, the maintenance of temperature below the boiling point of the acetaldehyde-acetic acid mixture for the particular pressure or pressures under which the process is being carried out; second, the gradual increase of temperature as the acid content of the reaction liquid increases; and third, the gradual increase of pressure as the reaction proceeds. The boiling point of an acetaldehyde-acetic acid mixture is raised by increasing the pressure, as is well known, but there is in addition to this a considerable rise in the boiling point as the percentage of acid in the mixture increases, so that as the process proceeds the temperature used in the process may be allowed to rise even if the pressure is constant and may be allowed to rise still more if the pressure is increased. The process starts at atmospheric or slightly higher than atmospheric pressure. In the early part of the period of operation the pressure is raised or allowed to rise comparatively rapidly up to, or nearly to, the elected maximum. When a suitably high pressure is reached the pressure is thereafter carefully controlled so that the increase, if any, will be gradual. For convenience, the condensation, where necessary, may be carried out under the same pressure as the reaction, but this is not essential as the condensation may be carried out at a different pressure than the reaction.

As has been previously stated the process may be carried out in a variety of ways. When using air the process is necessarily carried out under super-atmospheric pressures. It has been found that the best results, commercially speaking, are attained using pressures of approximately 60 to 75 lbs. per square inch but the process may also be carried out at pressures both below and above these pressures if suitable precautions are taken for temperature control at the higher pressures. It has also been found that for pressures of approximately 75 lbs. per square inch super-atmospheric, the best results are obtained when operating at a temperature between 55° C. and 75° C. but the reaction will take place at temperatures below 55° C. and considerably above 75° C. When operating at temperatures of 75° C. and over, a very efficient temperature control must be established or otherwise the reaction is liable to get beyond control, with the result that serious explosions may occur. For higher or lower pressures the temperatures should be correspondingly altered. Obviously the temperature of the reaction must not be allowed to rise above the boiling point of the aldehyde-acetic acid mixtures at any particular instant. Owing to the fact that the boiling point of the mixture increases with the acid content and that the boiling point of any particular mixture may be raised by increasing the pressure, it is impossible to express an upper temperature limit in degrees for the total period of the reaction. Therefore, the temperature limit can be expressed only by the statement that it is maintained well under the boiling point of the mixture at the pressure under which the reaction is taking place. This statement of the limit, while apparently vague, is in reality quite definite, especially if reference is had to a vapor pressure chart such as shown in the accompanying drawings, by means of which the maximum temperature for any chosen mixture and any chosen pressure may be readily determined. It has been previously supposed by some investigators of this subject that a certain amount of acetic acid must be present at the commencement of the process in order for the reaction to start or that the reaction must be carried on in presence of a certain amount of acetic acid. While such conditions may be true for some processes, they do not apply for the present process, according to which the reaction will commence in pure acetaldehyde under certain temperatures and pressure conditions. In the same way, the reaction would continue if the acid was removed at the rate of its formation, but the acid is allowed to remain as its presence somewhat increases the speed of reaction. In practice, moreover, it is not convenient to remove the acid, so that it is allowed to remain mixed with the aldehyde and further serves to make possible an increase in the temperature as the reaction continues (without necessarily increasing the pressure) so as to attain greater efficiency by reason of greater rapidity.

The only satisfactory method of carrying out the process using relatively pure oxygen under pressure is to confine an atmosphere of compressed gas, which is inert for the purposes of the reaction, above the reaction liquid. Gases suitable for the purpose are nitrogen or carbon dioxide, but others may be used, such as argon or helium and under certain conditions hydrogen. Owing to the use of super-atmospheric pressures higher temperatures may be employed than when working at atmospheric pressure, with the result that the absorption of oxygen is very rapid and the process highly efficient.

If the process is carried out using a gas mixture which approximates air in its oxygen content, the operation will be very similar to that already outlined for air. As an example of the gas mixtures contemplated, a mixture of oxygen and carbon dioxide is given.

In all methods of carrying out the process the efficiency is found to depend upon the combination and proper relation of temperature and pressure and also upon the possibility of increasing pressure and temperature as acid content of the reaction liquid increases.

In the accompanying drawings:—

Fig. 1 is a diagrammatic illustration of one form of apparatus suitable for carrying out the process, but to the use of which specific apparatus the process is not limited.

Figure 2:
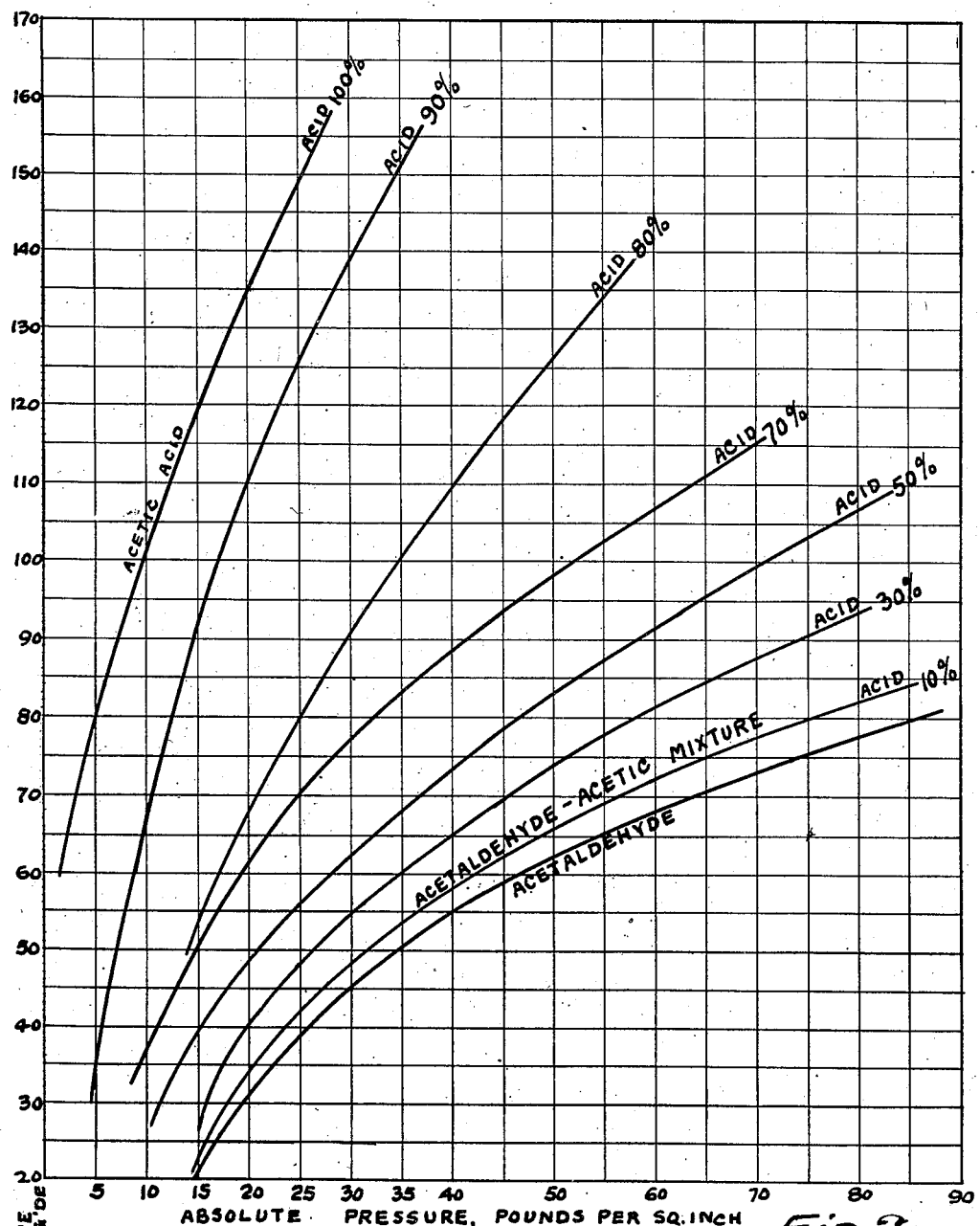
Fig. 2 is a chart of vapor pressure curves of pure acetaldehyde, acetaldehyde-acetic acid mixtures and pure acetic acid.

Referring to Figure 1 of the drawings, 11 designates a kettle having a lining which is impervious to the action of both aldehyde and acetic acid, such as aluminum. The kettle is provided with a coil 12 having connections for supplying either hot or cold fluid and is also provided with a perforated pipe 13 at the bottom, through which air may be admitted to bubble up through the liquid in the kettle to agitate the liquid and keep the catalyst in suspension therein. Vapor produced in the kettle passes through a pipe 14 to a condenser 15, from which condensate is refluxed to the kettle, at a point below the liquid level therein, through a U-seal 16. Gas may be blown off from the kettle through a valved pipe 17. At the discharge end of the condenser, an adjustably loaded gas discharge valve 18 may be provided to keep the pressure in the apparatus from rising above a predetermined amount. Catalyst may be fed into the kettle as necessary through a valved pipe 19.

In order that a full comprehension of the invention may be obtained, the following examples are given;—

*Example I.*

The kettle is charged with approximately 1000 gallons of acetaldehyde, containing any suitable substance which will act as a catalyst. While a number of substances may be used, such as salts of cerium or vanadium or the acetates of uranium or iron, it has been found that about 0.5% of manganese acetate is probably the most suitable both on account of its excellent catalytic properties and on account of its reasonably low cost. The temperature of the aldehyde is raised to a point where it will react with pure oxygen or with the oxygen of the air, namely 18° to 21° C. Air is now passed in in a manner to bubble up through the entire mass of the aldehyde. The air is introduced in smaller quantity at the commencement of the reaction when the temperature is comparatively low and the reaction therefore less vigorous and the rate of introduction is increased as the temperature and pressure rise, so as to keep the supply of oxygen very close to the possible rate of absorption. The catalyst also at the outset is not in active form and only becomes so on the passage of oxygen through the reaction liquor. In no case should pressure be employed until the catalyst becomes active and in no case should the supply of air or oxygen greatly exceed the absorption capacity of the liquor after pressure is applied or a mixture of oxygen and aldehyde vapor will be given off and the explosion hazard will be very great. The liquid aldehyde absorbs oxygen and is converted into acetic acid. The reaction is accompanied by great liberation of heat, which is absorbed as necessary by the temperature control means. When the reaction commences, the pressure is allowed to rise slowly during a period of approximately one to two hours to about 75 lbs. per square inch super-atmospheric and the temperature is also allowed to rise slowly to about 65° C. during the same time. The unabsorbed portion of the air, being nitrogen and a small amount of carbon dioxide, escapes from the reaction vessel through a relief valve which is adjusted to regulate the pressure in the kettle. This escaping nitrogen entrains a considerable amount of acetaldehyde vapor and a small amount of acetic acid. The aldehyde and acid are recovered by passing the mixed gases and vapors through a pair of condensers arranged in series and preferably maintained at the same pressure as the reaction vessel, and then if desired through a water scrubber. The condensate may be refluxed to the reaction vessel through a U-seal or check valve if the condensation is carried out at the same pressure as the reaction. If the condensation takes place at a lower pressure the condensate may be collected separately or may be returned to the reaction by any suitable means. At the end of from 8 to 12 hours the reaction is complete and the kettle contains acetic acid of 95% concentration or over, together with the dissolved catalyst and of course a small amount of acetaldehyde. The acid is refined by distillation and the product obtained is 98% to 99.5% pure acid commercially known as glacial acetic acid. From 6% to 8% of the original amount of aldehyde may be recovered by scrubbing the escaping nitrogen. The yield of acid ranges from 90% to 95% of the possible theoretical amount.

When using a gas mixture other than air, for example oxygen and carbon dioxide, the carbon dioxide is eliminated from the system in the same manner as just described for the elimination of nitrogen.

*Example II.*

The kettle is charged with 1000 gallons of acetaldehyde, to which is added approximately .5% of manganese acetate. The temperature of the aldehyde is now raised to about 18° to 20° C. and relatively or commercially pure oxygen is slowly blown into the base of the kettle at ordinary pressure. This is done for a few minutes in order to render the catalyst in active form. Pressure is now applied to the surface of the acetaldehyde by introducing nitrogen or other suitable gas, the reaction vessel being connected to reflux condensers as in Example I. The pressure is slowly increased during a period of one hour to 65 lbs. At the same time pressure of oxygen blown into the base of the kettle is increased in the same ratio and bubbles up through the acetaldehyde. The temperature is allowed to rise slowly, due to the exothermic reaction, to about 55° C. The oxygen under these conditions is completely absorbed by the aldehyde as it rises through the liquor. Practically no oxygen accumulates on the surface. The condensate from the condensers is returned as in Example I. At the end of one to two hours, the nitrogen pressure may be disconnected and the pressure maintained only by the addition of oxygen, provided that the equipment is sufficiently tight so that no nitrogen can escape. At the end of from eight to ten hours the reaction is complete and the product is purified as in Example I. Any other form of apparatus found suitable may be used.

By the method outlined above, nitrogen vapor is maintained at all times over the aldehyde and explosion hazard is eliminated. At the same time the speed of reaction is enormously increased, thus rendering the process a commercial success. If no pressure is used, the reaction period may extend over five to seven days, whereas as already mentioned, by the above means the reaction may be completed at the end of eight hours.

If in the above example, oxygen is used containing some nitrogen or other gas, the last condenser may be furnished with a pressure relief valve, and if nitrogen accumulates in the system, it may be periodically relieved by setting this valve at the pressure desired. As a matter of fact commercial oxygen always contains a small percentage of nitrogen which must be eliminated and the condensers serve merely to recover acetic acid and acetaldehyde from the nitrogen before it escapes. If chemically pure oxygen is used, the condensers are of course unnecessary. If the amount of nitrogen is very small the condenser may also be dispensed with and the nitrogen discharged from the top of the reaction vessel through any suitable relief valve.

It will be noted by reference to the accompanying drawing that for a pressure of 75 lbs., the boiling point of the pure aldehyde is about 75° C., so that the temperature of 65° to which the reaction is allowed to rise slowly after the commencement is well under the boiling point of the aldehyde. As the reaction progresses and the percentage of acid in the reaction mixture increases, it will be readily seen that the temperature may be allowed to rise considerably above 65° C. In fact, it will be observed from the direction of the curves on the chart that, toward the end of the process when the acid concentration is approximately 80%, it is possible to increase the temperature to approximately 150° C. and still be under the boiling point of the mixture. It is considered that, commercially, such temperatures are not advisable on account of the difficulty of controlling the reaction at these high temperatures and on account of the liability of too violent oxidation with formation of carbon dioxide and other products. When the maximum temperatures mentioned in the examples are reached, they may be maintained substantially constant for the remainder of the reaction period or the temperatures may be allowed to slowly rise as the acid concentration increases. It will be understood, therefore, that the invention is not limited to the actual working temperatures herein given as these may be increased to obtain more rapid production if the operator chooses to assume the risks attendant upon the higher temperatures.

A great advantage of the present process is that by utilizing both high temperature and high pressure, oxygen can be completely absorbed and at a high rate of speed, so that when using air or other gas mixture the gases passing from the reaction vessel contain substantially no free oxygen and the risk of explosion is thereby eliminated. While the present invention relates primarily to the manufacture of acetic acid using air, it will be understood that the features of temperature and pressure control relate equally to the manufacture using pure oxygen or oxygen diluted with gases, such as carbon dioxide.

While for various commercial reasons, the process is a batch or discontinuous one, it will be understood that it may be operated as a continuous process, especially when oxygen is supplied in the form of air. In this latter instance, if fractional condensation methods are employed, it will be evident that the acetic acid can be thus separated and need not be returned to the reaction but that an equivalent amount of fresh aldehyde may be supplied to keep the contents of the reaction vessel about constant. It will also be understood that when the reaction has progressed to a point where the acid concentration is, for example, between 70% and 80%, the contents of the vessel may be slowly and continuously withdrawn, the amount of acid withdrawn per unit of time being approximately equal to the amount of acid formed in the same unit of time and an equivalent amount of fresh aldehyde continuously added, so that the reaction liquor will be maintained at an approximately constant mixture of acetaldehyde and acid. In practice the catalyst is slowly destroyed or rendered inactive and in addition a certain amount would be continuously drawn off along with the acid, so that an appropriate addition of catalyst should be made either continuously or at short intervals of time if the process is to be carried on indefinitely.

The word "continuously" as used previously in connection with the abstraction of acid and the supply of aldehyde does not necessarily mean that the liquids must run in an absolutely uninterrupted stream but is intended to include the addition or removal of comparatively small amounts of liquid at short intervals of time.

Since the reaction which occurs is only between the oxygen and acetaldehyde, it will be understood that the term "oxygen" in the following claims includes both pure oxygen and oxygen admixed with other gases, such as in the form of air. It will further be understood that the term "pure oxygen" as used in the foregoing description and following claims is not limited to chemically pure oxygen but includes commercially or relatively pure oxygen and is used to distinguish between oxygen mixtures, such as air, and oxygen mixed with a relatively small amount of another gas or gases.

While the principal features of the invention, namely, maintenance of temperature below the boiling temperature of any acetaldehyde-acetic acid mixture; employment of rising temperature and rising pressure, have been described in connection with a particular method or process of making acetic acid it is to be understood that they are not limited to use in such a process but may be applied where desired singly or in any combination to other methods of making the acid.

Having thus described my invention, what I claim is:—

1. In a process of making acetic acid by oxidation of acetaldehyde while retaining formed acid in the acetaldehyde and after an initial rise in pressure at the commencement of the reaction, the step of further increasing the pressure above atmospheric as the acid content of the mixture increases.

2. In a process of making acetic acid by oxidation of acetaldehyde while retaining formed acetic acid in the acetaldehyde, the step of maintaining super-atmospheric pressure and after an initial rise in temperature at the commencement of the reaction of gradually raising the temperature as the acid content of the mixture increases.

3. In a process of making acetic acid by oxidation of acetaldehyde while retaining formed acid in the acetaldehyde and after an initial rise in pressure and temperature at the commencement of the reaction, the steps of maintaining super-atmospheric pressure and temperature both increasing as the acid content of the mixture increases.

4. In a process of making acetic acid by the oxidation of acetaldehyde while retaining formed acid in the acetaldehyde and after an initial rise in temperature at the commencement of the reaction to approximately the boiling point of acetaldehyde at the pressure used, the step of increasing the temperature as the acid content of the mixture increases and maintaining temperature below the boiling point of the mixture.

5. A process of making acetic acid, which comprises passing oxygen into acetaldehyde in presence of a catalyst under an atmosphere inert to the reaction, and maintaining a temperature below the boiling point of the acetaldehyde-acetic acid mixture and above the boiling point of acetaldehyde at the pressure obtaining.

6. A process according to claim 5, in which the pressure of the atmosphere is increased as the amount of acid increases.

7. In a process of making acetic acid by oxidation of acetaldehyde while retaining formed acetic acid in the acetaldehyde, the step of maintaining a temperature above the boiling point of acetaldehyde under the pressure obtaining and below the boiling point of the acetaldehyde-acetic acid mixture under the pressure obtaining.

8. In a process of making acetic acid by oxidation of acetaldehyde while retaining formed acetic acid in the acetaldehyde, the steps of initially raising the temperature between 55° and 75° C. under super-atmospheric pressure and thereafter maintaining a temperature between the boiling point of acetaldehyde and the boiling point of the acetaldehyde-acetic acid mixture under the pressure obtaining.

9. In a process of making acetic acid by oxidation of acetaldehyde, the steps of increasing the pressure and temperature of the reaction and increasing the supply of oxidizing agent approximately proportionately to the increases of pressure and temperature.

10. In a process of making acetic acid by oxidation of acetaldehyde under super-atmospheric pressure, the steps of increasing the temperature and increasing the supply of oxidizing agent in predetermined ratio to the increase of temperature to maintain the supply substantially equal to the rate of absorption.

11. In a process of making acetic acid by oxidation of acetaldehyde while working at temperature above approximately 20° C., the steps of increasing the temperature as the acid content of the reaction liquid increases and increasing the supply of oxidizing agent in predetermined ratio to the increase of temperature to maintain the supply at substantially the maximum rate of absorption.

12. A process of making acetic acid by oxidation of acetaldehyde while retaining formed acid in the acetaldehyde, the steps of working under super-atmospheric pressure and maintaining a temperature between 65° C. and the boiling point of the acetaldehyde-acetic acid mixture under the pressure prevailing.

13. In a process of making acetic acid by oxidation of acetaldehyde while retaining formed acid in the acetaldehyde and, after an initial rise in pressure at the commencement of the reaction to above forty-five pounds super-atmospheric, the step of further increasing the pressure during the course of the reaction as the acid content of the mixture increases.

14. In a process of making acetic acid by oxidation of acetaldehyde while retaining formed acetic acid in the acetaldehyde, the step of maintaining pressure above forty-five pounds super-atmospheric and, after an initial rise in temperature at the commencement of the reaction, the step of gradually further raising the temperature as the acid content of the mixture increases.

15. In a process of making acetic acid by oxidation of acetaldehyde while retaining formed acetic acid in the acetaldehyde and after a rise in pressure to above forty-five pounds super-atmospheric and in temperature both occuring in the early stages of the reaction, the steps of further increasing both pressure and temperature during progress of the reaction as the acid content of the mixture increases.

In witness whereof, I have hereunto set my hand.

HOWARD W. MATHESON.